3,119,661
METHOD FOR RECOVERY OF SiO₂ AND ZrO₂ FROM ZIRCON
Edgel P. Stambaugh, Montgomery, and Raymond A. Foos, Loveland, Ohio, assignors to National Distillers and Chemical Corporation, New York, N.Y., a corporation of Virginia
Filed June 18, 1959, Ser. No. 821,224
3 Claims. (Cl. 23—140)

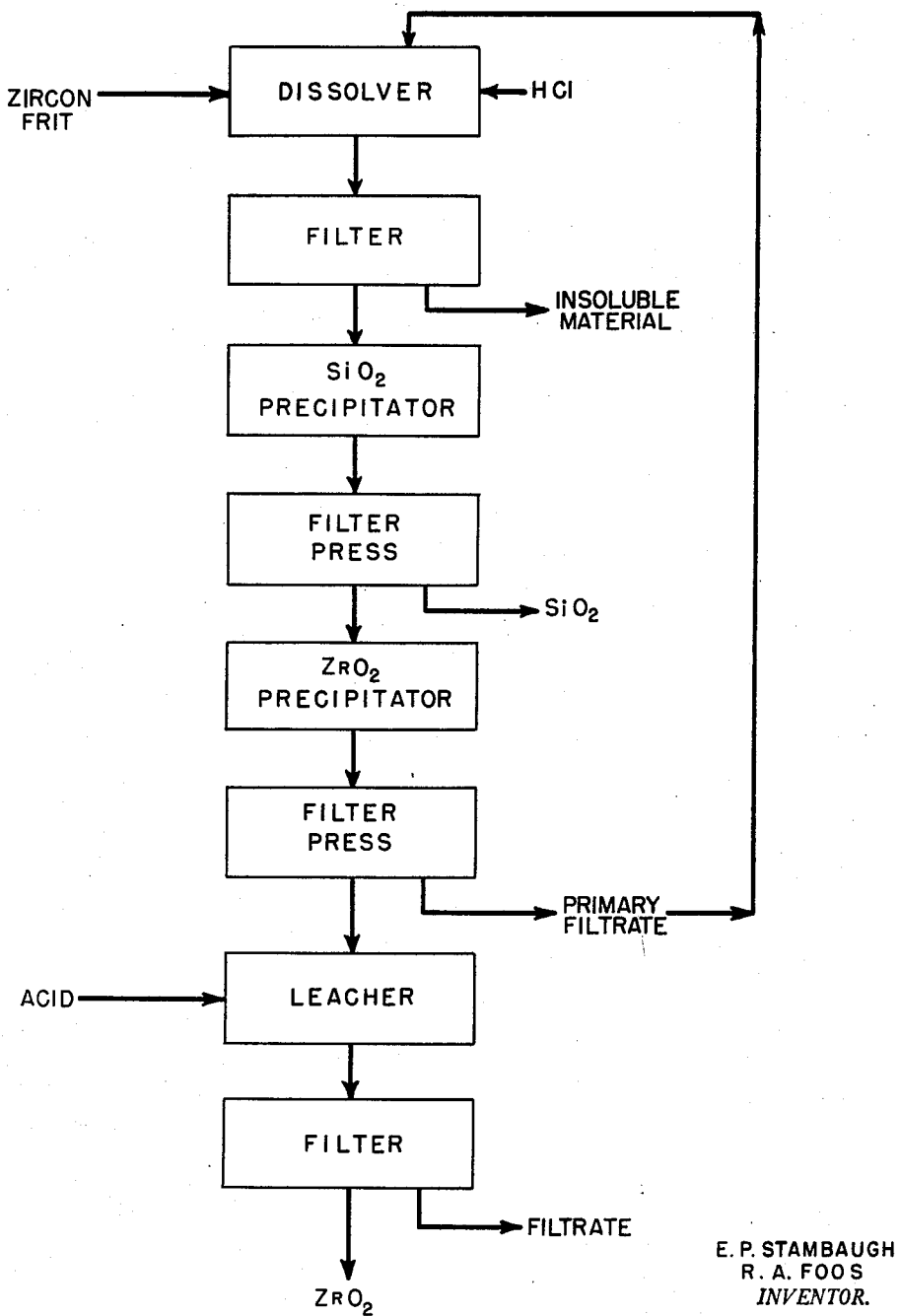

This invention relates to a method for separating silicon dioxide from oxygen-containing salts of other metals. More particularly, the invention pertains to a method for separating silicon dioxide from zirconium dioxide and/or hafnium dioxide in a batchwise or a continuous process. The invention also relates to a method for obtaining purified zirconium dioxide from zirconium acid salt solutions containing silicon and other metal impurities.

In a recently proposed process, E. P. Stambaugh and R. A. Foos application Serial Number 821,120, entitled "Zirconium Dioxide Recovery," zirconium dioxide was recovered from zirconium acid salt solutions by treatment under certain prescribed temperature and pressure conditions. When starting with a crude zirconium-containing feed material, it was found that the finely divided zirconium dioxide product contained reduced levels of many metallic impurities. More specifically, the metallic impurities reduced below contaminating levels included aluminum, iron, magnesium, manganese, nickel, etc. With respect to silicon, however, no appreciable decrease in content was obtained. Thus, if the feed material contains a high percentage of silicon impurity, a corresponding amount of silicon will be present in the zirconium dioxide product. This would be particularly undesirable where high purity zirconium dioxide is desired or where the presence of silicon would have a deleterious effect on the end use of the zirconium dioxide or materials prepared therefrom. For example, the liquid-liquid extraction separation of zirconium from hafnium utilizing nitrate or chloride systems requires silicon impurity levels below 1000 p.p.m., based on zirconium, in order to prevent plugging of the equipment. Another method of removing silicon dioxide from zirconium dioxide involves dehydration of the silicon dioxide in 20 to 25% hydrochloric acid at 100° C. The silicon dioxide precipitates in an insoluble form, whereas the zirconium dioxide remains in solution. However, this dehydration process requires high acid concentration, leads to low yields of zirconium dioxide, and is relatively expensive.

One object of this invention is to provide an improvement over the aforementioned proposed processes. Another object of the invention is to provide a process for the separation of silicon dioxide from zirconium dioxide at low acid concentrations. A further object of the invention is to provide a process for the preparation of purified, finely divided zirconium dioxide and/or hafnium dioxide. Other objects will become apparent from the ensuing description of the invention.

The improved process of the invention includes as an essential step the removal of the silicon dioxide from the zirconium acid salt solution prior to the precipitation of the zirconium dioxide therefrom. This is accomplished by initially treating the zirconium acid solution under certain prescribed conditions whereby substantially all of the silicon dioxide is selectively precipitated therefrom. After the precipitated silicon dioxide is filtered from the solution, the filtrate is treated to precipitate a finely divided zirconium dioxide product, which contains less than contaminating amounts of silicon as well as other metallic impurities such as aluminum, iron, magnesium, nickel, lead, rare earths, manganese, etc. By operating in accordance with the method of this invention, a high grade zirconium dioxide product is readily produced. Such a product is, for example, particularly useful as a pigment for paint, a ceramic tile-glazing component, as well as for other known applications of zirconium dioxide.

The crude zirconium-silicon acidic salt solutions useful as the feed material in the present process may be derived from any known source or conventional process. It has been found convenient, however, to prepare this feed by dissolving water-leached zircon frit in hydrochloric acid. Other mineral acids which may be used for this purpose include sulfuric acid, nitric acid, mixtures thereof, etc. The zircon frit is derived from the caustic fusion of zircon sand, followed by water leaching to remove a major proportion of the soluble sodium silicates. In a representative example, a water-leached zircon frit so obtained contained approximately 27.5% water, 11.2% sodium oxide, 48.0% zirconium dioxide, 9.4% silicon dioxide and 3.9% acid insolubles. It will be understood, however, that the amount of silicon dioxide in the zircon frit will vary from batch to batch. Nevertheless, extensive water leaching did not succeed in reducing the silicon dioxide levels to below about 6.0%. In practicing the inventive method, the zirconium-silicon salt solution will contain about 20 to 180, preferably 75 to 100, grams per liter of zirconium dioxide and up to 30, generally 4 to 15, grams per liter of silicon dioxide. In order to reduce the silicon content below contaminating levels, it has been found essential to employ sufficient acid in the dissolution step to give an acid concentration of about 140 grams per liter (10–12%) and generally within the range of about 75 to 200 grams per liter. The use of hydrochloric acid for this purpose is preferred.

In accordance with the present invention, zirconium-silicon acidic salt feed solution is treated batchwise by first heating to a temperature within the range of at least about 120°, preferably about 165° to 175° C., and at a pressure of about 30 to 150 p.s.i., preferably about 50 to 70 p.s.i. This treatment will generally be carried out for about 15 to 60 minutes. The resulting slurry will be cooled to about 60° to 90° C., any residual pressure released, and filtered to remove precipitated material comprising substantially all of the silicon dioxide and a minor proportion of the zirconium dioxide. The filtrate, on the other hand, contains the bulk of the zirconium dioxide and various metallic impurities. Conventional closed kettles or vessels, such as a Parr autoclave, may be employed in carrying out this step. In actual operation it is preferred to provide the vessel with stirring means in order to have continuous agitation or stirring, although such a procedure is not essential.

The filtrate recovered from the above separation step is next treated in similar equipment to prepare finely divided, purified zirconium dioxide. More specifically, the filtrate is treated at a temperature of at least about 150° C., preferably about 180° to 190° C., and under a pressure of at least 100 p.s.i., preferably about 150 to 170 p.s.i. The treatment period may vary from about 2 to 60 minutes, preferably from about 5 to 15 minutes. Since it is essential in this step to have an acid concentration within the range of about 60 to 180 grams per liter, preferably about 80 to 140 grams per liter, water or acid can be added to the filtrate if required prior to treatment. The resulting slurrry is filtered to recover solid, finely divided zirconium dioxide particles. It is preferred to filter the slurry while it is still hot, i.e., at a temperature of about 70° to 90° C. The filter cake can be washed with a dilute mineral acid solution, preferably about 10% hydrochloric acid, if desired. Multiple washing steps may be employed to insure the complete removal of acid-soluble impurities. The zirconium dioxide so obtained will have an average particle size of about 1 to 5 microns and will be of high quality. It is apparent that this two-stage process also can be carried out isothermally by adjusting pressures with inert gases or air. Filtration can be carried out under elevated temperatures and pressures so that a cooling down and heating up cycle is not required.

It will be understood that in the above process steps the time of treatment will not include the time required to heat the feed solutions to the treatment temperatures, and that the acid concentration is calculated as the total titratable acid including both free and combined acid. If anhydrous or dehydrated metal dioxide is desired, the metal dioxide products may be subjected to calcination using standard methods such as heating the hydrates to temperatures of 600° C. or higher.

In accordance with one embodiment of this invention, an inert material such as carbon, calcium sulfate, titanium dioxide, and the like may be added to the feed filtrate recovered from the first step or second steps. By operating in this manner an intimate mixture of the finely divided zirconium dioxide or silicon dioxide in admixture with inert, solid material can be readily produced. The use of carbon in this connection is especially preferred, since it acts as a filter aid during the recovery of the precipitated zirconium oxide from the supernatant liquid and results in a zirconium dioxide-carbon mixture which is ideal for chlorination. The amount of inert material which can be employed will range from about 1 to 50%. Homogeneous mixtures can also be found by utilizing columbium pentoxide, tantalum pentoxide, tungsten pentoxide, molybdenum trioxide and the like as the inert material.

In order to illustrate one method of practicing the present invention, reference is made to the accompanying drawing which is a self-explanatory schematic flow sheet. As illustrated, the zircon frit, derived from any source, is initially treated with hydrochloric acid to effect dissolution. The resulting slurrry is filtered to remove insoluble materials, which may either be discarded or recycled (not shown). The filtrate is next subjected to the conditions outlined above whereby the silicon dioxide is preferentially precipitated, and removed from the system by filtration, in for example, a filter press. In accordance with one aspect of this invention, the silicon dioxide so recovered is of sufficient purity to be readily employed in commercial applications. The filtrate is then subjected to the zirconium dioxide precipitation conditions, as described above, filtered, leached with acid and refiltered to give a high purity hydrated zirconium dioxide product. As shown in the drawing, the filtrate recovered from the initial filtration of the precipitated zirconium dioxide is recycled to the dissolver to increase the percentage yields and to aid in dissolving fresh zircon frit. It will be apparent that the silicon dioxide and zirconium dioxide precipitators as well as the particular filtration apparatus associated therewith may be one integral unit. The process as shown can be operated in a continuous, semi-continuous or batchwise manner.

The following example demonstrates the invention in more detail. This example is furnished only by way of illustration and not of limitation.

EXAMPLE

Feed solutions (750 ml. each) were prepared by dissolving washed zircon frit in a hydrochloric acid solution to obtain the final solutions containing the noted acid, $ZrO_2$ and $SiO_2$ concentrations.

In the runs set forth in the table below each of the feed solutions was treated initially in a two-liter Parr autoclave provided with a Teflon mixer under the temperature, pressure, and time conditions enumerated. The resulting slurries were quenched to about 70°–80° C. and filtered. The filter cakes containing silicon dioxide and a small amount of zirconium dioxide were discarded. The recovered filtrates were then treated in a similar Parr autoclave under the conditions given below to precipitate the zirconium dioxide values, which were recovered from the resulting slurries by filtration at a temperature of about 70° to 90° C. The filter cakes were washed twice with 200 cc. of 10% hydrochloric acid. The degree of recovery and the analysis of the zirconium dioxide products are also set forth below.

Table

|  | Runs | | | | Crude After $SiO_2$ Removal |
|---|---|---|---|---|---|
|  | 1 | 2 | 3 | 4 |  |
| Feed Solution: |  |  |  |  |  |
| $ZrO_2$, g./l | 97.95 | 95.55 | 70.1 | 70.1 |  |
| HCl, g./l | 77.80 | 176.6 | 141 | 141 |  |
| $SiO_2$, g./l | 12.7 | 12.7 | 4.3 | 4.3 |  |
| First Precip. Conditions: |  |  |  |  |  |
| Temp., °C | 150 | 150 | 175 | 175 |  |
| Pressure, p.s.i. | 50 | 50 | 100 | 100 |  |
| Time, min. | 60 | 60 | 60 | 15 |  |
| Filtrate Analysis: |  |  |  |  |  |
| Si, p.p.m.[1] | 6000 | 780 | 780 | 600 |  |
| $ZrO_2$, g./l | 96.7 | 91.3 | 60.6 | 68.5 |  |
| HCl, g./l | 82.2 | 168.7 | 137.0 | 145.2 |  |
| Second Precip. Conditions: |  |  |  |  |  |
| Temp., °C | 180 | 180 | 185 | 185 |  |
| Pressure, p.s.i. | 150 | 150 | 155 | 155 |  |
| Time, min. | 15 | 15 | 15 | 15 |  |
| Precipitate Analysis: |  |  |  |  |  |
| $ZrO_2$, percent recovery | 99.3 | 94.8 | 98.7 | 96.3 |  |
| Al, p.p.m. | 15 | 15 | <25 | <25 | >600 |
| B, p.p.m. | 7 | 8 | 7 | 8 | 2 |
| Cd, p.p.m. | <0.5 | <0.5 | <0.5 | <0.5 | <0.1 |
| Co, p.p.m. | <5 | <5 | <5 | <5 |  |
| Fe, percent | 60 | 70 | 50 | 40 | >0.3 |
| Mg, p.p.m. | <10 | <10 | <10 | <10 | 220 |
| Mn, p.p.m. | <5 | <5 | <5 | <5 | 500 |
| Ni, p.p.m. | 55 | 15 | 16 | 11 | >400 |
| Pb, p.p.m. | <10 | <10 | <10 | <10 | 55 |
| Si, p.p.m. | 5,600 | 640 | 650 | 400 |  |
| Sn, p.p.m. | <5 | <5 | <5 | <5 | 45 |
| V, p.p.m. | <10 | <10 | <10 | <10 | 15 |
| Hf × 100/Hf + Zr, percent |  |  | 2.35 | 2.15 |  |

[1] Metal weight based on weight of zirconium metal.

The above data show that the inventive process can be effectively utilized to separate silicon dioxide from zirconium dioxide. In the addition, the data show that by employing the above described two stage process, outstanding yields of high quality zirconium dioxide can be readily achieved. As run No. 1 demonstrates, lower contrations of hydrochloric acid in the zirconium-silicon salt feed solution lead to inadequate silicon dioxide removal if approximately 1.0% silicon dioxide has a deleterious effect on the end use of the zirconium dioxide.

While particular embodiments of this invention are shown above, it will be understood that the inventive process is obviously subject to variations and modifications without departing from its broader aspects. Thus, for example, the process of this invention may be employed to separate silicon values from other metals such as nickel, aluminum, manganese, thorium, uranium, vanadium, hafnium and the like. For the purposes of this invention, hafnium is not considered to be an impurity in the zirconium feed and product. In fact, as described above, a mixture of zirconium and hafnium dioxides or hafnium dioxide itself may constitute a product of the inventive process.

What is claimed is:

1. In a method for recovering purified silicon dioxide and zirconium dioxide from zircon sand which comprises fusing zircon sand with caustic, leaching the resulting zircon frit with water to remove soluble sodium silicates and dissolving the water leached zircon frit in a mineral acid, the improvement which comprises heating said mineral acid solution, having an acid concentration within the range of about 75 to 200 grams per liter, containing about 20 to 180 grams per liter of zirconium dioxide and up to 30 grams per liter of silicon dioxide together with other metallic impurities, at a temperature of about 165° to about 175° C. and under a pressure of about 30 to 150 p.s.i. to preferentially precipiate substantially all of the silicon as purified silicon dioxide; cooling the resulting slurry, recovering the precipitated silicon dioxide from the acid solution containing zirconium values and said metallic impurities; heating the silicon-free acid solution, having an acid concentration within the range of about 80 to 140 grams per liter, at a temperature of about 180° to 190° C. and at a pressure of about 150 to about 170 p.s.i. to precipitate purified zirconium dioxide; and separating said precipitated purified zirconium dioxide from a solution containing said metallic impurities.

2. The method of claim 1 wherein said mineral acid is selected from the group consisting of hydrochloric acid, sulfuric acid, nitric acid and mixtures thereof.

3. The method of claim 1 wherein said mineral acid is hydrochloric acid.

References Cited in the file of this patent
UNITED STATES PATENTS

| | | |
|---|---|---|
| 1,158,769 | Askenasy | Nov. 2, 1915 |
| 1,609,826 | Kinzie | Dec. 7, 1926 |
| 1,858,100 | McAdoo | May 10, 1932 |
| 2,076,080 | George et al. | Apr. 6, 1937 |
| 2,783,126 | Richter | Feb. 26, 1957 |
| 3,009,777 | Evans et al. | Nov. 21, 1961 |

FOREIGN PATENTS

| | | |
|---|---|---|
| 271,873 | Great Britain | Sept. 24, 1928 |
| 610,549 | Great Britain | Oct. 18, 1948 |

OTHER REFERENCES

Beyer et al.: U.S. Atomic Energy Commission Report, ISC–437 (rev.), August 17, 1954, pages 1–14.

Blumenthal: "The Chemical Behavior of Zirconium," D. Van Nostrand Company, Inc., New York, 1958, pages 154–158.